United States Patent [19]
Szczepanek

[11] Patent Number: 5,983,305
[45] Date of Patent: Nov. 9, 1999

[54] NETWORK ADAPTER WITH DATA ALIGNER

[75] Inventor: Andre Szczepanek, Bedford, United Kingdom

[73] Assignee: Texas Instruments Incorporated, Dallas, Tex.

[21] Appl. No.: 08/874,801

[22] Filed: Jun. 13, 1997

Related U.S. Application Data

[63] Continuation of application No. 08/334,299, Nov. 4, 1994, Pat. No. 5,721,841.

[51] Int. Cl.⁶ ................................................... G06F 15/02
[52] U.S. Cl. ............................................................. 710/129
[58] Field of Search ...................... 395/200.3, 200.8, 395/842, 872, 309, 310; 710/129, 130, 1, 2, 3, 33, 36, 52, 53, 65, 72

[56] References Cited

U.S. PATENT DOCUMENTS

| | | | |
|---|---|---|---|
| 4,617,659 | 10/1986 | Chopping et al. | 370/468 |
| 4,756,011 | 7/1988 | Cordell | 375/371 |
| 5,014,236 | 5/1991 | Pogorzelski et al. | 710/66 |
| 5,179,671 | 1/1993 | Kelly et al. | 712/300 |
| 5,392,406 | 2/1995 | Petersen et al. | 710/131 |
| 5,446,869 | 8/1995 | Podgett et al. | 395/500.48 |
| 5,455,915 | 10/1995 | Coke | 710/113 |
| 5,491,802 | 2/1996 | Thompson et al. | 709/236 |
| 5,721,841 | 2/1998 | Szczepanek | 710/130 |

*Primary Examiner*—Moustafa M. Meky
*Attorney, Agent, or Firm*—J. Dennis Moore; Wade James Brady, III; Richard L. Donaldson

[57] ABSTRACT

A data aliginmentation apparatus and method in a LAN adapter. The arrangement includes a data aligner mechanism and a transfer control mechanism that transfer data between this RAM and a PCI bus. A transfer control mechanism pre-calculates the control parameters for the aligner/data-pipe, creates the necessary byte enables for data transfers, and determines the number of transfers needed. This allows the data aligner to create a stream of data words for any arbitrary byte transfer with full PCI data streaming (one 32 bit word every PCI clock cycle).

The Data Aligner provides a shifter and data-pipe that is used to convert the RAMs 64 bit words into PCIs 32 bit words. It is bidirectional and is used to convert 64 bit data from the RAM into 32 bit PCI word(s) and vice versa.

1 Claim, 2 Drawing Sheets

NETWORK ADAPTER WITH DATA ALIGNER

This application is a continuation of application Ser. No. 08/334,299 filed Nov. 4, 1994 is now U.S. Pat. No. 5,721,841.

BACKGROUND OF THE INVENTION

1. Field of the Invention

This invention relates to improvements in local area network adapters.

2. Background Art

A local area network (LAN) is a high bandwidth computer network, operating over an area, such as an office or a group of offices. In order for individual computers to communicate with others or with a host or server each computer must have a LAN adapter.

Two styles of LAN adapter have emerged due to the predominance of Ethernet and Token-Ring networks. The Ethernet MAC protocol requires no local processing, so Ethernet adapters tend to be simple "dumb" adapters. The Token-Ring protocol requires local processing of MAC frames by the adapter, so Token-Ring adapters need a local CPU, making them "smart" adapters. These smart adapters usually use some form of "store and forward" architectiure due to the need for local processing. Storage may, for example, be provided by a random access memory (RAM) array.

Fragmentation of data is a feature of many LAN protocols and accordingly there is a need for LAN adapters to be capable of fragmenting data preferably into arbitrary byte length fragments starting on any byte address.

In some protocols, frames are created from, for example, as many as ten separate fragments. Fragments which may be any number of bytes long are not guaranteed to start on a word boundary and of course the word boundary itself is determined by the system.

Advanced buses such as PCI (Peripheral Component Interconnect), stream data as bursts of word transfers (32 bit on PCI). Fully utilizing the bandwidth possible on such buses and meeting the fragmentation requirements of LAN protocols stacks is a challenging problem.

SUMMARY OF THE INVENTION

According to the present invention in a first aspect thereof, there is provided an adapter for connecting a network system to a peripheral component, in which the adapter includes a memory for storing data received from or to be transmitted to the network, and a data aligner connected between the memory and the network. The aligner includes a register for storing data, the register being loaded to or from the memory with an offset in accordance with predetermined network fragmentation parameters.

DESCRIPTION OF THE DRAWINGS

In order that features and advantages of the present invention may be more fully appreciated, an embodiment will now be described, by way of example, and with reference to the accompanying diagrammatic drawing figures of which.

DETAILED DESCRIPTION OF THE PREFERRED EMBODIMENTS

Figure 1:
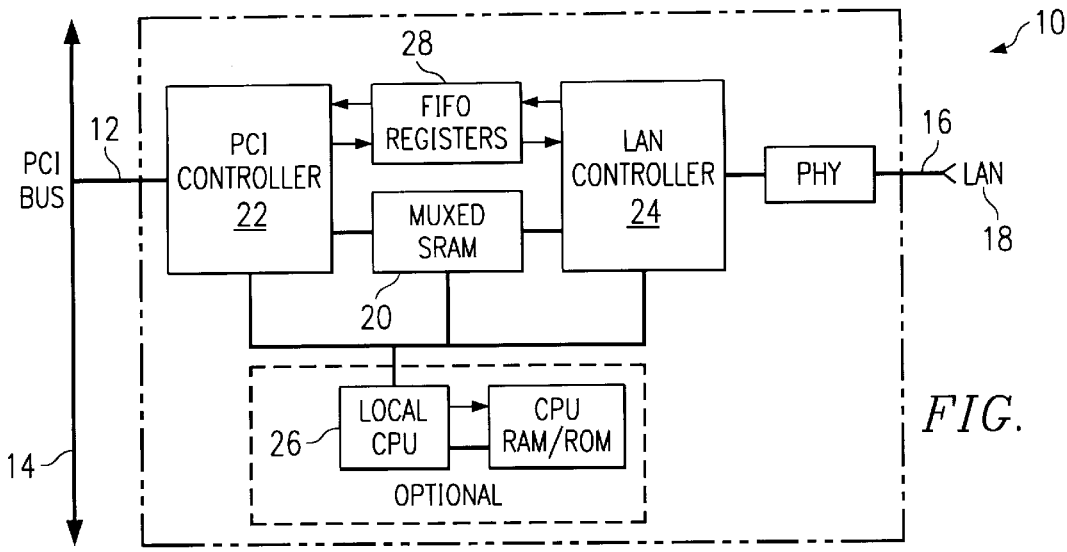
FIG. 1 represents a LAN adapter.

The adapter shown generally at 10 includes a connection (12) to a Peripheral Component Interconnect bus (PCI Bus) (14) and a LAN connection (16) to the LAN (18). The adapter includes a triported Static Random Access Memory SRAM (20) which is connected between a PCI bus controller (22) and a LAN controller (24). The third port is an optional connection to an optional local CPU (26). FIFO control registers 28 are used to implement circular buffer FIFOs in the multiported SRAM for network data. It will be understood that the SRAM could be replaced by any other type of RAM memory array. In a preferred embodiment of the invention, the RAM is a Time Division Multiplex (TDM) ported RAM with a high bandwidth. The RAM is used to provide both network data FIFOs and control data storage. In addition, if local frame processing is required the RAM can also be accessed by the local CPU (26).

The adapter stores network data and control information in the internal RAM array. This RAM has a wide access port (twice the host bus w&idth or more), and is clocked synchronously to the host bus clock. A RAM access port that is twice the width of the host bus means that transfers to/from the host bus at the maximum bus rate (one word per cycle) only require access to the RAM every other cycle. The other cycles can be used to allow network or local CPU accesses to the RAM.

The present invention may be incorporated into the PCI controller to interface directly with a 64 bit wide RAM which is accessed synchronously to the host system bus clock.

The arrangement to be described includes a data aligner mechanism and a transfer control mechanism that transfer data between this RAM and a PCI bus. A transfer control mechanism pre-calculates the control parameters for the aligner/data-pipe, creates the necessary byte enables for data transfers, and determines the number of transfers needed. This allows the data aligner to create a stream of data words for any arbitrary byte transfer with full PCI data streaming (one 32 bit word every PCI clock cycle).

The Data Aligner provides a shifter and data-pipe that is used to convert the RAM's 64 bit words into PCI's 32 bit words. It is bidirectional and is used to convert 64 bit data from the RAM into 32 bit PCI word(s) and vice versa.

Figure 2:
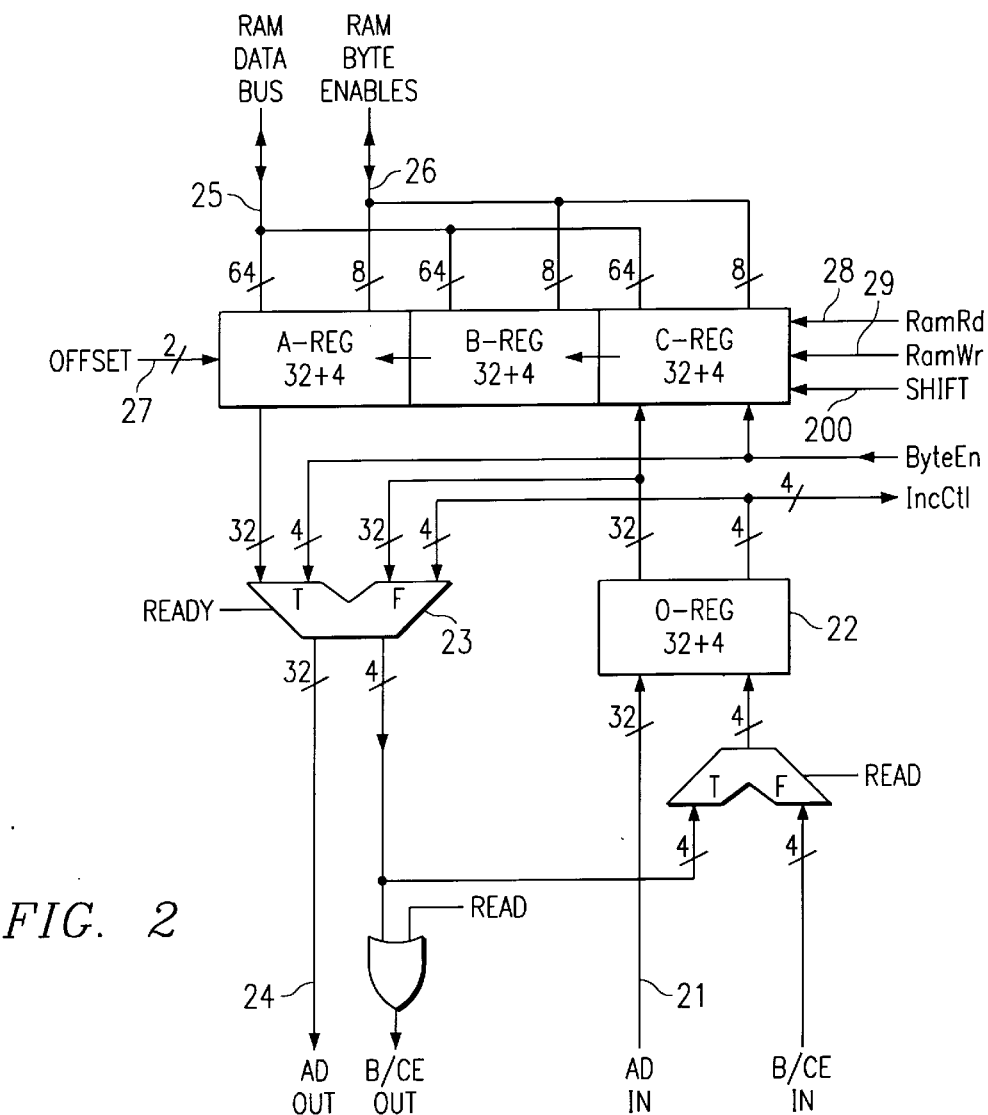
FIG. 2 represents a data aligner for use in a LAN adapter.

The Data Aligner (FIG. 2) comprises three 32 bit registers (A-Reg, B-Reg, C-Reg) in which data may shift from C to B and from B to A. The arrangement has a connection 21 to the PCI Address/Data bus AD to a data input/holding latch 0-Reg22. 0-Reg22 is used to both sample incoming data for data reads and to maintain outgoing data if the target of a write operation is not ready. Accordingly, there is a data path via a multiplexor 23 to PCI bus output connection 24.

The A-Reg, B-Reg and C-Reg registers are arranged such that they may be read from or written to the RAM via a data bus 25 and byte enable bus 26 with one of four byte offsets dependant upon a bit control signal supplied at 27. Read, Write and Shift controls respectively 28, 29, 200 are also provided to the registers.

The offset may be specified as follows:

0: An offset of zero loads/reads 64 bits from registers A-Reg and B-Reg.

1: An offset of one loads/reads 64 bits composed of the least significant 3 bytes of A-Reg, all of B-Reg, and the most significant byte of C-Reg.

2: An offset of two loads/reads 64 bits composed of the least significant 2 bytes of A-Reg, all of B-Reg, and the most significant 2 bytes of C-Reg.

3: An offset of one loads/reads 64 bits composed of the least significant byte of A-Reg, all of B-Reg, and the most significant 3 bytes of C-Reg.

By combining this offset capability with 32 bit shifts between the registers data can be aligned to any byte boundary (on either side) and maintained for a data burst allowing full data fragmentation.

The diagram also shows that the A-Reg, B-Reg and C-Reg registers contain byte enable flags in addition to data and the shifting/offset process serves to direct byte enables as well as data.

Figure 3:
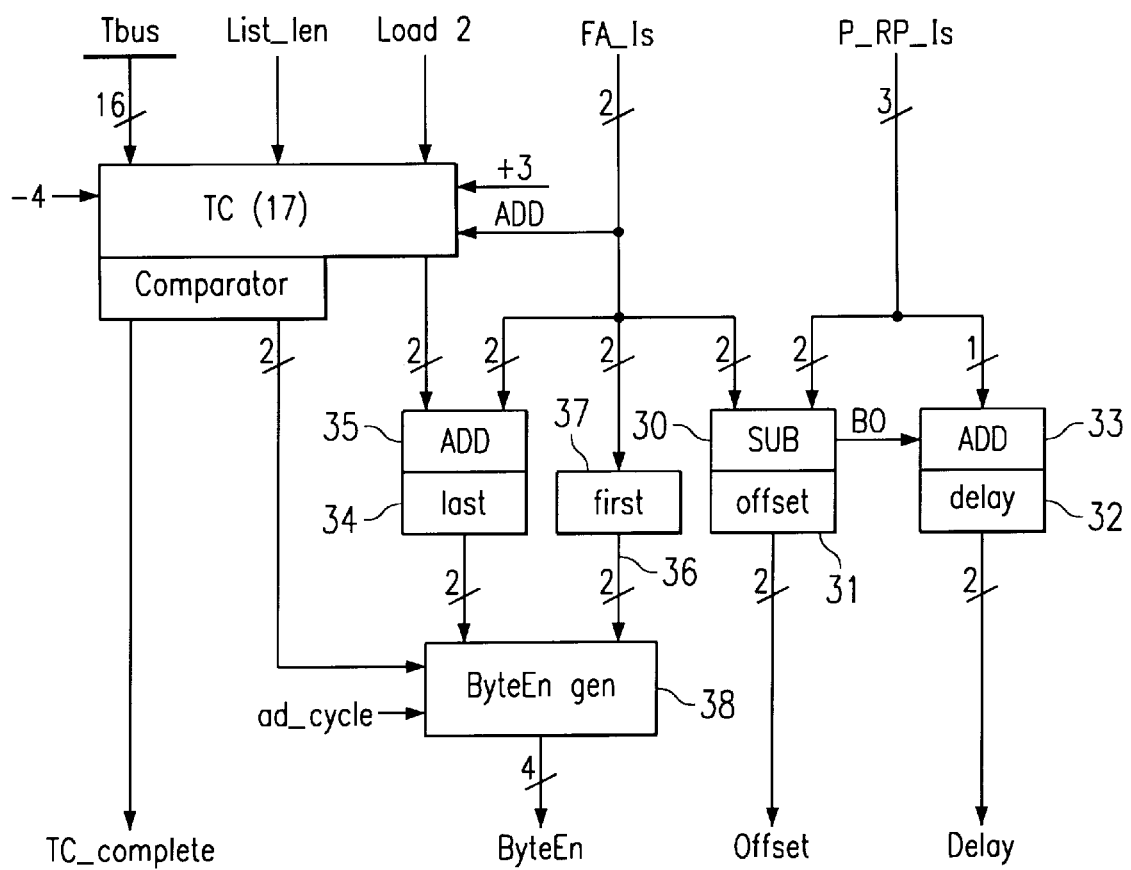
FIG. 3 represents a Transfer Controller for use with the data aligner of FIG. 2.

The derivation of the control signals will now be considered in more detail, and in the present embodiment these signals are supplied by a separate transfer controller block (FIG. 3). The controller acts to calculate the controls prior to a data burst. This calculation, which in the present embodiment requires PCI cycles, may occur during PCI bus arbitration.

Before the data burst, certain information which can be predetermined and accessible to the task controller, typically being stored in registers within the PCI controller. The parameters needed to calculate the control parameters are the host address (FA register), transfer length in bytes (TC register from TBUS) and local RAM address (P-RP). The calculation proceeds as follows:

Offset (the offset in bytes at which 64 bit RAM words are read/written into the data aligner registers).

Offset=(FA & 0x3)−(P-RP & 0x3)

This is a straightforward 2 bit subtraction; the resulting borrow out (bo) being used in the delay calculation below.

Delay (the delay in the data aligner)

delay=(P-RP & 0x4)+bo

Transfer count: the number of host PCI word transfers to complete the burst. The adapter uses this count to know when the burst is complete. Transfer can start on an odd byte address and be an odd number of bytes in length, so the number of word transfers is calculated as follows:

new_TC=old_TC+3+(FA & 0x3);

Where old_TC is the transfer length in bytes, and new_TC is the transfer length in words (ignore 2 L.S. bits).

First: the byte mask to be used for the first data transfer. The mask is coded as a 2 bit variable. This is actually just the 2 least significant bits of Fa.

The first bits indicate the number of disabled bytes as follows:

first=0: Byte Enables=0b1111
first=1: Byte Enables=0b0111
first=2: Byte Enables=0b0011
first=3: Byte Enables=0b0001 last: the byte mask to be used for the last data transfer. The mask is coded as a 2 bit variable. This is calculated as follows:

last=old_tc+(FA & 0x3);

The last bits indicate the number of enabled bytes (with zero indicating 4) as follows:

last=1: Byte Enables=0b1000
last=2: Byte Enables=0b1100
last=3: Byte Enables=0b1110
last=0: Byte Enables=0b1111

A hardware implementation is illustrated in the block diagram of FIG. 3. Offset (31) is generated in a 2 bit subtractor 30, delay (32) is an adder 33 and last (34) in adder 35. The first bit mask (36) is generated in a logic block 37 as shown.

The byte enable generator 38 receives first, last as well as transfer count and address cycle (ad-cy) information. It decodes the first and last latch bits and combines them to form the actual byte enables. For single cycle DMA bursts (i.e. bursts of less than 5 bytes), the byte enable for the transfer is the logical ANDing of the first and last byte enables. The byte enable for intermediate transfers (which by definition must be complete word transfers) is all ones (0b1111).

The calculation takes place over two cycles. In the first cycle offset, delay, first and last are calculated and TC incremented by 3. In the second (FA & 0x3) is added to TC.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, amd not limiting. The invention is limited only as defined in the following claims and equivalents thereto.

What is claimed is:

1. An adapter for connecting a network system to a peripheral component, said adapter including a memory for storing data received from or to be transmitted to said network and a data aligner connected between said memory and said network, wherein said aligner includes a register for storing data, said register being loaded to or from said memory with an offset in accordance with predetermined network fragmentation parameters, wherein said offset is precalculated in a transfer controller, and wherein said controller also calculates delay.

* * * * *